United States Patent [19]

Nakashima et al.

[11] Patent Number: 4,540,332

[45] Date of Patent: Sep. 10, 1985

[54] SWIVEL DEVICE

[75] Inventors: Seiichiro Nakashima; Hajimu Inaba, both of Hino; Shigemi Inagaki, Kokubunji, all of Japan

[73] Assignee: Fanuc Ltd., Tokyo, Japan

[21] Appl. No.: 486,083

[22] Filed: Apr. 18, 1983

[30] Foreign Application Priority Data

Apr. 21, 1982 [JP] Japan .................................. 57-65409

[51] Int. Cl.³ ............................................. B25J 9/00
[52] U.S. Cl. .................................... 414/744 R; 414/4; 414/687; 901/15; 901/23
[58] Field of Search ....................... 414/744, 4, 7, 917, 414/687; 901/15, 22, 37, 23; 104/38, 46; 248/349

[56] References Cited

U.S. PATENT DOCUMENTS 3,572,519 3/1971 Tezuka ............................ 901/22 X
3,840,128 10/1974 Swoboda, Jr. ................... 901/22 X
4,378,959 4/1983 Susnjara ........................... 901/15 X
4,392,776 7/1983 Shum ................................ 901/15 X
4,396,344 8/1983 Sugimoto et al. ................ 901/15 X

FOREIGN PATENT DOCUMENTS 58-28480 2/1983 Japan .

Primary Examiner—Terrance L. Siemens
Attorney, Agent, or Firm—Armstrong, Nikaido, Marmelstein & Kubovcik

[57] ABSTRACT

A swivel device for supporting a swivel unit thereon, including a hollow main frame and a comparatively slender rotatable shaft disposed upright within the hollow frame, connectable to the swivel unit at the upper end thereof and connected to a driving source at the lower end thereof through a transmission mechanism. All control cables and conduits for controlling the mechanisms mounted on the swivel unit are accommodated in the space formed within the hollow frame around the upright shaft.

6 Claims, 2 Drawing Figures

SWIVEL DEVICE

BACKGROUND OF THE INVENTION

1. Field of the Invention

The present invention relates to a swivel device having a swivel unit disposed in the upper part thereof and being designed to supply electric signals, electric power, and a pressurized fluid to the swivel unit through cables and conduits and more particularly to a swivel device for swiveling the robot motion unit, including a robot arm, of an industrial robot.

2. Description of the Prior Art

An industrial robot, in general, has a construction in which a swivel device is disposed in the base part thereof and a robot motion unit including a robot arm, a robot wrist, and a robot hand is mounted on the swivel device. In such a swivel device, a motor and reduction gear means such as a Harmonic Drive (registered trademark) of a high reduction ratio are built into the swivel device in the central part thereof, and the robot motion unit is turned by the motor through the Harmonic Drive and, in addition, cables are used for supplying electric power to the respective driving motors of the shafts provided in the robot motion unit or are used as signal lines, while conduits are used for supplying pressurized air to the robot hand-operating mechanism. Within the swivel device, the cables and conduits are disposed so as to turn along the outside of a post member enclosing the motor and the Harmonic Drive as the robot motion unit is swiveled. In such a cable and conduit arrangement system, however, since the cables and conduits wind round the outside of the post member enclosing the motor within the swivel device as the robot motion unit is swiveled, the cables and the conduits are caused to move a great degree depending on the outside diameter of the post member. Furthermore, since the post member disposed within the swivel device remains stationary when the robot motion unit mounted on the swivel device is swiveled, the cables and the conduits rub on the surface of the post member as they move, which is liable to cause abrasion in the cables and deteriorates the reliability of the industrial robot. Still further, the above-mentioned construction, in which the motor is disposed in the central part of the swivel device, has a shortcoming in that maintenance works, such as the periodic inspection of the motor or the replacement of the motor, if necessary, are extremely difficult.

SUMMARY OF THE INVENTION

Accordingly, it is an object of the present invention to provide a swivel device of a construction in which the shortcoming of the conventional swivel device employed in an industrial robot is eliminated and in which, not only in an industrial robot, but also in a general device for swiveling a swivel unit, the movement of cables connected to the swivel unit is reduced to the least necessary degree and maintenance of the motor are facilitated.

In accordance with the present invention, there is provided a swivel device for supporting a swivel unit thereon. The device comprises a hollow frame and an upright shaft disposed in the central part of the hollow frame having a connecting portion formed in the upper end thereof and connected at the lower end thereof to a driving motor disposed substantially outside the hollow frame through a transmission mechanism. The space within the hollow frame around the upright shaft is used for accommodating control cables and conduits.

BRIEF DESCRIPTION OF THE DRAWINGS

Other objects and features of the invention will be apparent from the following detailed description of a preferred embodiment thereof, reference being made to the accompanying drawings, in which.

DESCRIPTION OF THE PREFERRED EMBODIMENT

Figure 1:
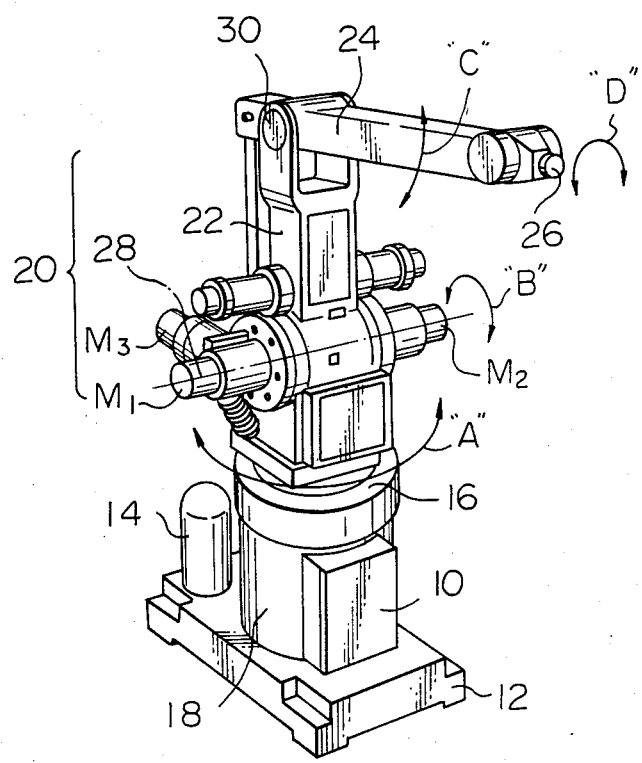
FIG. 1 is a perspective view of an industrial robot employing a preferred embodiment of the swivel device according to the present invention, the figure showing the constitution thereof.

Referring to FIG. 1, a swivel device 10 of the present invention is included in the base section of an industrial robot and is disposed on a base 12 placed on the floor. A robot motion unit 20 is mounted on the top 16 of the swivel device 10 and is capable of being swiveled with respect to the swivel device 10 in the opposite directions of the double-headed arrow A, namely, clockwise and counterclockwise directions. The swivel device 10 has a driving motor 14 disposed outside of the main frame 18 thereof. The driving force of the driving motor 14 is transmitted to the robot motion unit 20 through a transmission mechanism or a reduction gear, not illustrated, to make the robot motion unit 20 perform the above-mentioned swivel motion. On the other hand, the robot motion unit 20 has movable units, such as a robot body 22, a robot arm 24, and a robot wrist 26. The movable units are designed so as to be controlled by a robot control unit, not illustrated, to perform a turning motion about the center axis of a horizontal shaft 28, as is shown by the double-headed arrow B, upward and downward swinging motions about the center axis of a horizontal shaft 30, as is shown by the double-headed arrow C, and a wrist turning motion about the longitudinal center axis of the robot arm 24, respectively. Driving motors for driving the movable units are indicated by $M_1$, $M_2$, and $M_3$. Electric power is supplied to the driving motors $M_1$, $M_2$, and $M_3$ by means of control cables, not illustrated in FIG. 1, accommodated within the swivel device 10 disposed below the robot motion unit 20. A robot hand, not shown, which is actuated by pressurized air supplied through control conduits, is mounted on a free end of the robot wrist 26. The pressurized air supply conduits are so arranged that they extend from the interior of the swivel device 10 to the robot body 22 and further to the robot hand via the interior or the side surface of the robot arm 24.

Figure 2:
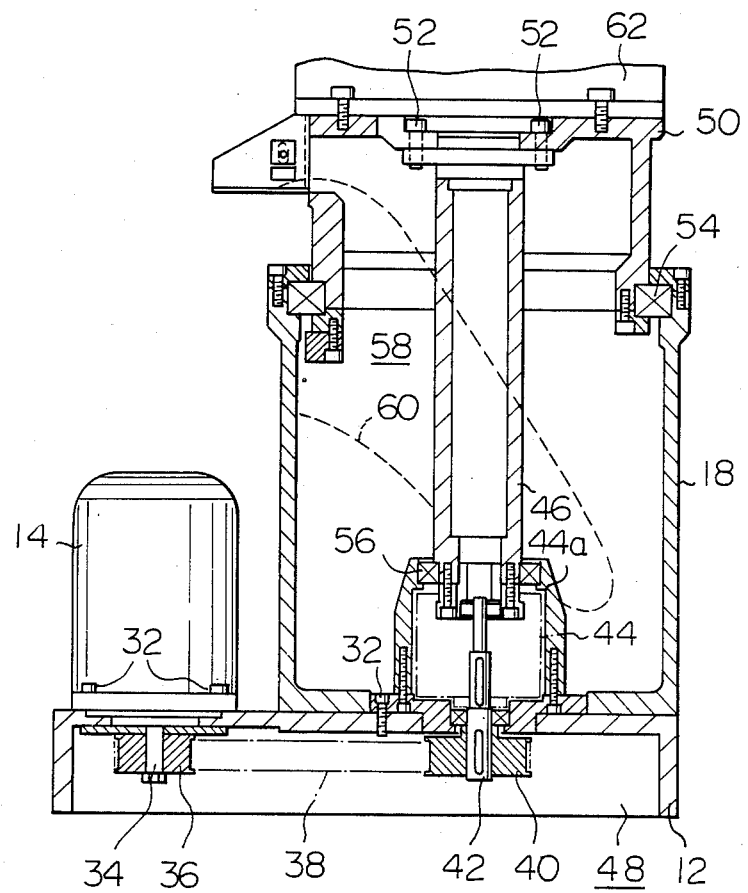
FIG. 2 is a longitudinal sectional view of a swivel device according to the present invention illustrating the construction of the essential part thereof.

The characteristic construction of the swivel device 10 of the present invention is described hereinafter with reference to FIG. 2. As is illustrated in FIG. 2, the swivel device 10 has a hollow main frame 18 which is fastened to the base 12 with fastening means 32, such as screw bolts. Naturally, the hollow main frame 18 and the base 12 may be formed as an integral structure, as required. As was mentioned-above, the driving motor 14, serving as a driving source of the swivel motion, is disposed outside of the hollow main frame 18 and is fastened to the upper surface of the base 12 also with fastening means 32, such as screw bolts. An upright shaft 46 made of a rather slender rod is disposed rotatably practically in the central part of the hollow main frame 18. The lower end of the upright shaft 46 is connected to a reduction gear 44 preferably of a Harmonic Drive. The input shaft 42 of the reduction gear 44 protrudes outside into a chamber 48 formed in the base 12. A pulley 40 is mounted on the free end of the input shaft 42. The output shaft 34 of the driving motor 14 also protrudes into the chamber 48 of the base 12. A pulley 36 is mounted on the free end of the output shaft 34. The pulleys 36 and 40 are connected by a belt 38. That is, the rotative driving force of the driving motor 14 is transmitted to the upright shaft 46 through a transmission mechanism consisting of the pulleys 36 and 40, the belt 38, and the reduction gear 44. The upper end of the upright shaft 46 is attached to a support table 50 with bolts 52. The support table 50 is rotatably supported by the main frame 18 by means of a rotary bearing 54. Since the upright shaft 46 connected to the support table 50 is supported rotatably at the lower end thereof by a rotary bearing 56 housed in the housing 44a of the reduction gear 44, the upright shaft 46 and the support table 50 turn integrally about the center axis of the upright shaft 46 when a rotative driving force is transmitted to the upright shaft 46 in the manner described hereinbefore. Accordingly, a swivel unit, such as the above-mentioned robot motion unit 20 (FIG. 1), mounted on the support table 50 can be driven for swivel motion. Furthermore, in the swivel device 10 of the present invention, the vertical chamber 58 formed in the hollow main frame 18 and the support table 50 enclosing the upright shaft 46 are utilized for accommodating all cables and conduits 60 which are made of flexible materials. That is, the control cables and conduits 60, which supply electric power, electric signals, and pressurized fluid to the swivel unit 62 mounted on the support table 50 to control the swivel unit 62 for various motions, are arranged so as to be partly wound around the comparatively slender upright shaft 46 having a necessary mechanical strength with a reserve length suited for permitting the swivel motion of the swivel unit 62. The cables and conduits 60 are extended to the swivel unit 62 through an opening (not shown) formed in a suitable part of the support table 50 and are connected to the swivel unit 62. In this constitution, since the upright shaft 46 is slender, the reserve length of the cables and conduits 60 can be reduced greatly as compared with that of the conventional device in which the cables and conduits are arranged round a post member of a comparatively large outside diameter. Furthermore, the amount of movement of the cables and conduits 60 within the vertical chamber 58 accompanying the swivel motion of the swivel unit 62 is reduced correspondingly and hence a defect, such as entanglement of the cables and conduits 60, is avoided while the necessary length of the cables and conduits 60 is also reduced, thereby reducing the cost. Furthermore, since the upright shaft 46 turns together with the support table 50 and the swivel unit 62, the spiral movement within the vertical chamber 58 of the cables and conduits 60 arranged round the upright shaft 46 causes only a small relative rubbing action between the cables and conduits 60 and the shaft 46, and, hence, wear of the respective surfaces of the cables and conduits 60 is reduced to a minimum. Accordingly, even in such a construction in which the control cables and conduits 60 are arranged round the upright shaft 46, wear of the cables and conduits 60 is restricted to a minimum. Consequently, the life of the cables and conduits 60 is prolonged, and, eventually, the swivel device 10 becomes more reliable and the life thereof is prolonged.

Furthermore, in the swivel device of the present invention, since the driving motor for swivel motion is disposed outside of the main frame 18, it is obvious that the maintenance of the motor is simplified and facilitated.

As is apparent from what has been described hereinbefore, according to the present invention, the possible occurrence of defects due to the provision of various control cables and conduits within a swivel device supporting a swivel unit thereon is eliminated and simplified and facilitated maintenance works for the driving motor for swivel motion are readily attainable. Therefore, the application of the present invention not only to the main swivel section of an industrial robot but also to rotary table devices to supply electric signals or power to the apparatus mounted thereon will improve the reliability of the device remarkably.

We claim:

1. A swivel device for supporting thereon a swivel unit, comprising:
    (a) a base forming a lowermost element of said swivel device;
    (b) a hollow frame means fastened onto said base and defining therein a generally vertically extended space;
    (c) an upright shaft of substantially small diameter relative to the diameter of said hollow frame rotatably supported in substantially the center of said space of said hollow frame means, said upright shaft having an upper end thereof connectible to said swivel unit;
    (d) a drive means connected to a lower end of said upright shaft for rotation, said drive means comprising a driving motor disposed on said base and outside said hollow frame means and a transmission mechanism arranged between said driving motor and said lower end of said upright shaft, and a reduction gear connected to said lower end of said upright shaft; and
    (e) cable and conduit means accommodated in said vertically extended space of said hollow frame means and circumferentially disposed around said upright shaft for controlling said swivel unit.

2. A swivel device according to claim 1, wherein said hollow frame means comprises a stationary main frame and a substantially cylindrical support table rotatably mounted on said stationary main frame, said support table being connected to said upper end of said upright shaft.

3. A swivel device according to claim 2, wherein said lower end of said upright shaft is supported by a rotating bearing housed in a housing disposed in the lowermost part of said stationary main frame.

4. A swivel device according to claim 1, wherein said base is formed therein with a space for arranging said transmission mechanism of said drive means.

5. A swivel device according to claim 1, wherein said cable and conduit means are arranged so as to be partly wound around said upright shaft inside said hollow frame means.

6. A swivel device according to claim 1, wherein said swivel unit on said swivel device comprises a robot motion unit of an industrial robot.

* * * * *